United States Patent [19]

Schad

[11] Patent Number: 4,588,364

[45] Date of Patent: May 13, 1986

[54] CLAMP MECHANISM

[75] Inventor: Robert D. Schad, Toronto, Canada

[73] Assignee: Husky Injection Molding Systems Ltd., Bolton, Canada

[21] Appl. No.: 718,803

[22] Filed: Apr. 1, 1985

[51] Int. Cl.[4] .......................... B30B 11/02; B29F 1/06
[52] U.S. Cl. ................................. 425/135; 425/136;
425/137; 425/138; 425/154; 425/451.4;
425/451.6; 425/451.9; 425/593; 425/595;
425/DIG. 221; 425/DIG. 223
[58] Field of Search .............. 425/136, 137, 138, 154,
425/450.1, 451.4, 451.5, 451.6, 451.9, 589, 592,
593, 595, 135, DIG. 220, DIG. 221, DIG. 222,
DIG. 223

[56] References Cited

U.S. PATENT DOCUMENTS

| | | | |
|---|---|---|---|
| 2,072,694 | 3/1937 | Walter | 425/DIG. 220 |
| 2,113,115 | 4/1938 | MacMillan et al. | 425/DIG. 220 |
| 2,258,093 | 10/1941 | Hastrow | 425/451.6 X |
| 3,117,348 | 1/1964 | Rees | 425/154 |
| 3,292,214 | 12/1966 | Battenfeld et al. | 425/594 X |
| 3,310,842 | 3/1967 | Fischbach | 425/589 X |
| 3,345,691 | 10/1967 | Aoki | 425/451.6 X |
| 3,712,774 | 1/1973 | Parker | 425/154 |
| 3,830,614 | 8/1974 | Kurtz | 425/451.6 X |
| 4,038,003 | 7/1977 | Hansson | 425/137 |
| 4,316,712 | 2/1982 | Medendorp | 425/451.6 X |
| 4,376,744 | 3/1983 | DeSantis | 425/451.5 X |

Primary Examiner—J. Howard Flint, Jr.
Attorney, Agent, or Firm—Bachman & LaPointe

[57] ABSTRACT

A clamp mechanism for selectively locking and unlocking a first member in a first position relative to a second member comprises a linkage system connecting the first and second members and drive means for articulating the linkage system for moving the first member relative to the second member. A fluid link is provided for locking the first member in position relative to the second member wherein the fluid link is actuated upon sensing the first member approaching the first position.

32 Claims, 4 Drawing Figures

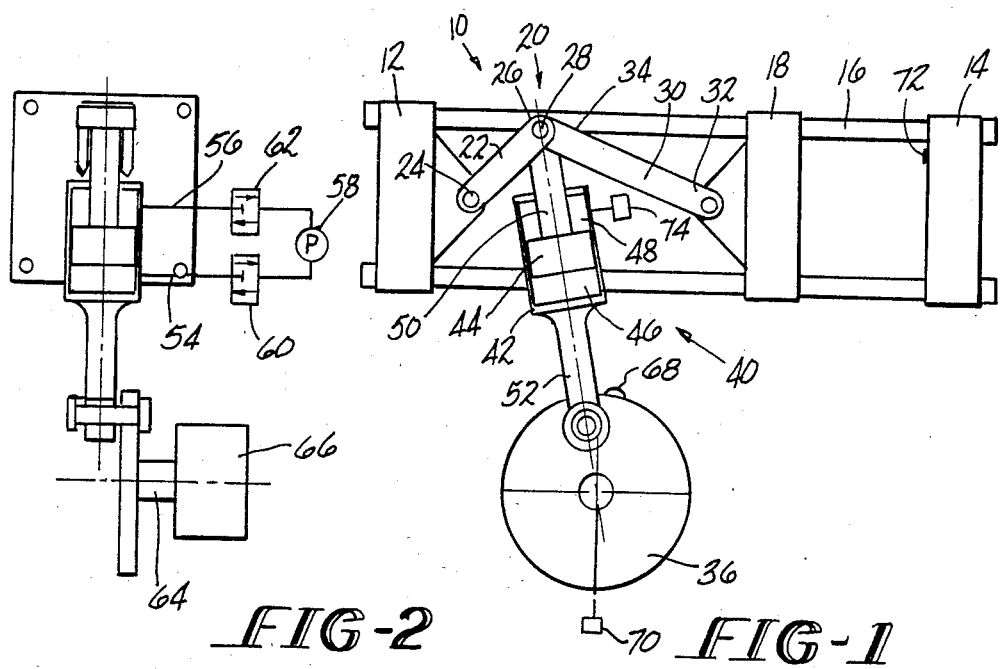
FIG-2   FIG-1
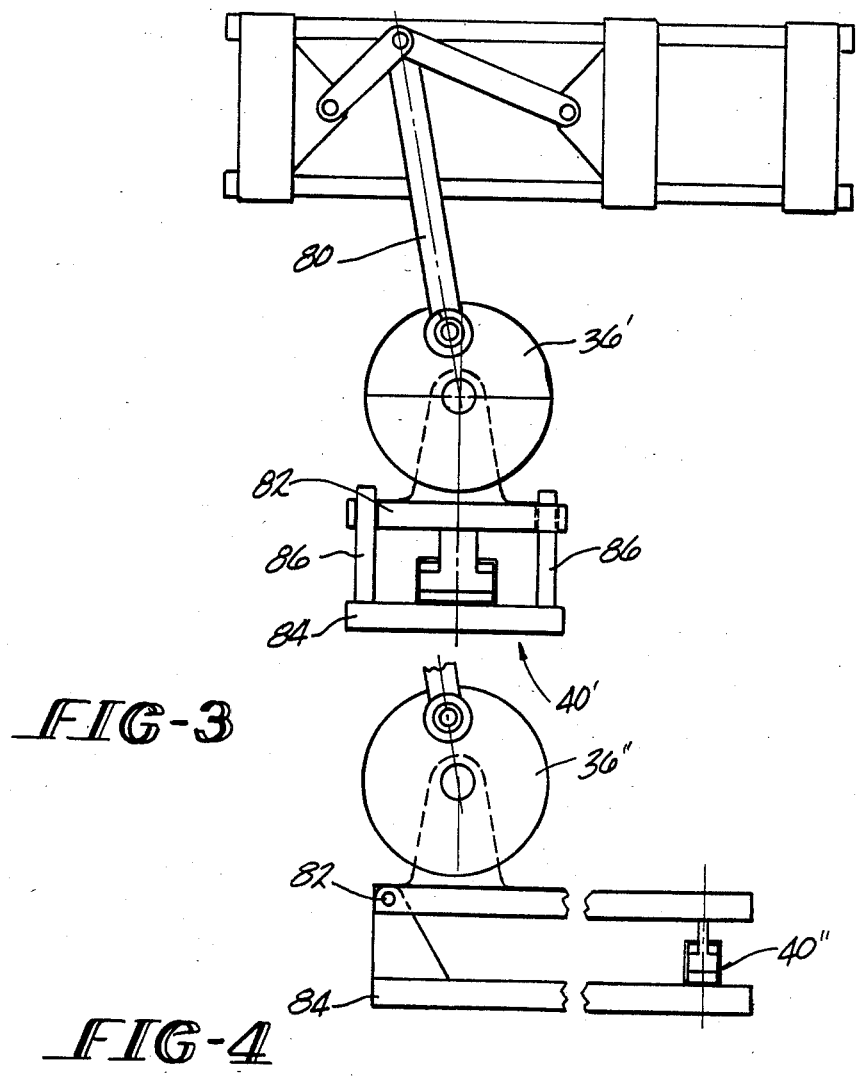
FIG-3
FIG-4

CLAMP MECHANISM

BACKGROUND OF THE INVENTION

The present invention relates to an improved clamp mechanism and method for operating same and, more particularly, an improved clamp mechanism for use in a reciprocating press such as an injection molding machine wherein a fluid link is employed to affect the clamping of a pair of platen halves together.

Toggle clamps used in presses for injection molding, compression molding, die casting and the like are well-known in the art. A typical toggle clamp mechanism is disclosed in U.S. Pat. No. 3,117,348 to Rees and Schad which is assigned to the assignee of the present invention. As disclosed in U.S. Pat. No. 3,117,348, the toggle mechanism is actuated by a connecting rod which works in conjunction with a rotating disk which is driven by a variable speed drive motor. The mechanism is designed so as to allow for the disk to rotate always in the same direction. In order to actuate the toggle mechanism a pinion gear provided on the disk engages the drive shaft of the variable speed motor by means of a clutch. The disk rotates so as to push and pull the toggle system which is articulated by the connecting rod which links the rotating disk with the center pin of the toggle system. When the toggle system is stretched out the platens of the press abut each other and are in their locked position. In the stretched out position, the pinion is unclutched from the drive motor and a brake is applied so that the connecting rod and the corresponding toggle mechanism, which are now in their stretched out position, are immobilized so as to lock the platens in place. The locking force is transmitted linearly from the space between the platens onto the abutment holding the toggle system and any movement of the center link of the toggle system, which would result in the release of the clamping action, is absorbed by the fixed position of the disk pinion and connecting rod thereby resulting in the entire assembly being immobilized. As can be seen from the foregoing the opening and closing movements of the platens is effected by the rotating disk via the connecting rod and linkage system whereby the connecting rod holds and pushes the toggle links corresponding to the opened and closed positions of the platens. The rotating disk is stopped by the clutch and brake arrangement in one or both of the positions corresponding to the fully opened and fully locked positions of the platens.

The primary advantage of the toggle system as described above is its great speed, that is, the opening and closing sequence of the platens is carried out without the necessity of reversing the actuating element as is customarily required by other known toggle systems which are typically actuated by reciprocating cylinders. While the above-described system has been used extensively in industry it nevertheless has certain drawbacks and disadvantages when employed in systems requiring locking forces in excess of 250 tons. In particular, it has been found that the transmission system tends to be overstressed and therefore not function with the desired degree of reliability when attempts are made to increase the locking force that may be exerted by the system. In addition, the drive provided by a motor with a conventional variable speed pulley drive tends to be oversized and the drive itself not adequate for the operation of large clamps thereby requiring the use of alternate mechanicam drives which tend to be large, occupy a great deal of space in a given machine and quite expensive. Finally, the clutch and brake system employed is not designed for highly stressed conditions. To summarize, when working with locking forces in excess of 250 tons the reliability of the system described above is limited.

Naturally it would be highly desirable to provide a clamp mechanism suitable for use in reciprocating presses and the like which overcome the problems noted above with regard to prior art clamp mechanisms.

Accordingly, it is the principal object of the present invention to provide a novel transmission suitable inter alia for use with clamp mechanisms for selectively locking and unlocking a member in place.

It is a particular object of the present invention to provide a clamp mechanism as aforesaid which is particularly useful in reciprocating presses such as pressure molding machines.

It is a further object of the present invention to provide a transmission as aforesaid which employs a fluid link for positioning a member in place.

It is a still further object of the present invention to provide a clamping mechanism as aforesaid in a reciprocating press wherein means are provided for sensing an obstruction between the relatively movable press members.

It is another still further object of the present invention to provide a clamp mechanism as aforesaid which is of simple construction, economic to manufacture and easily used with a high degree of reliability.

Further objects and advantages of the present invention will appear hereinbelow.

SUMMARY OF THE INVENTION

In accordance with the present invention, the foregoing objects and advantages are readily obtained.

The present invention relates to an improved transmission for operating same and, more particularly, an improved clamp mechanism incorporating such transmission for use in a reciprocating press wherein a fluid link is employed to effect the clamping of a pair of platen halves together. The device of the present invention comprises a first movable member connected by a linkage system to a second stationary member. The linkage system is articulated by means of a drive for moving the first member relative to the second member. A locking mechanism is associated with the linkage system for locking the first member in place relative to the second member at a predetermined distance from said second member. In accordance with the principal feature of the present invention, a sensing element is provided for sensing when the first member is proximate to the predetermined distance from the second member for activating the fluid link for locking the first member in place. The sensing means may take the form of a conventional limit switch which is activated by the drive mechanism. In accordance with the present invention, the fluid link comprises a cylinder having a piston reciprocally mounted therein for dividing the cylinder into first and second chambers wherein fluid under pressure is fed to and from the first and second chambers upon the sensing of the location of the first member by the sensing mechanism so as to lock the first member in place.

When employing the clamp mechanism of the present invention in a reciprocating press wherein a movable platen is reciprocated relative to a fixed platen between a first position wherein the platens abut and a second position wherein the platens are fully opened, a sensing mechanism is provided for sensing an obstruction between the fixed platen and the movable platen for inactivating the fluid link so as to prohibit damage to the platen halves. The term "platens" as used herein denotes the platens together with components such as mold elements that may be attached thereto.

The device of the present invention offers significant advantages over clamp transmission mechanisms and methods used heretofore. First, by providing a fluid link for locking the toggle mechanism in place, locking forces in excess of 250 tons can be effected without stressing the clamp actuating mechanism excessively. In addition, the clamp mechanism of the present invention assures a high degree of reliability heretofore not obtainable by prior art devices.

Further advantages of the present invention will appear hereinbelow.

BRIEF DESCRIPTION OF THE DRAWINGS

FIG. 1 is a schematic illustration of the clamp mechanims in accordance with the principles of the present invention.

FIG. 2 is a side view of the mechanism of FIG. 1.

FIG. 3 is a schematic illustration of a second embodiment of the clamp mechanism in accordance with the principles of the present invention.

FIG. 4 is a schematic illustration of a third embodiment of the clamp mechanism in accordance with the principles of the present invention.

DETAILED DESCRIPTION

While the present invention will be described with reference to a reciprocating press and in particular a reciprocating press clamp for pressure molding, it should be appreciated that the transmission mechanism of the present invention may be employed in many other environments without departing from the scope of the instant invention.

Referring to the drawings, and particularly FIGS. 1 and 2, a reciprocating press 10 is illustrated showing the clamp mechanism of the present invention. The press 10 comprises an abutment 12 and a fixed platen 14 mounted on supports 16 in spaced apart relationship. The supports 16 are in the form of tie bars. A movable platen 18 is mounted on the tie bars 16 between the abutment 12 and the fixed platen 14 and is capable of reciprocal movement on the tie bars 16 in the direction shown by the arrow by means of linkage system 20.

The linkage system 20 comprises a first link 22 having one end 24 rotatably mounted to the abutment member 12 and its other end 26 rotatably mounted to a link pin 28 and a second link member 30 having one end 32 rotatably mounted to movable platen 18 and the other end 34 rotatably mounted to the link pin 28 such that the first link 22 and the second link 30 are joined by the link pin 28.

In accordance with a particular feature of the present invention, the linkage system 20 as shown in the embodiment of FIG. 1 is connected to drive disk 36 by means of a connecting rod in the form of a length varying fluid link 40. As shown in FIG. 1 the fluid link comprises a cylinder 42 having a piston 44 reciprocally mounted therein for dividing the cylinder into first and secnd chambers 46 and 48, respectively. The piston 44 is provided with a piston rod 50 which is pivotably secured to link pin 28 of linkage assembly 20. The cylinder 42 is provided with an arm 52 for rotatably mounting the cylinder 42 on the drive disk 36 in an eccentric manner. Naturally, it should be appreciated that an equivalent structure can be obtained by reversing the fluid link, that is, by connecting the cylinder 42 to the link pin 28 and the piston 44 to the drive disk 36 via piston rod 50. Fluid lines 54 and 56 are connected to chambers 46 and 48, respectively, for communicating fluid under pressure from a source 58 selectively via valves 60 and 62 to and from the chambers 46 and 48 in a manner to be discussed in detail hereinbelow.

Drive disk 36 is rotatably secured to the output shaft 64 of a hydraulic motor 66. The rotational speed of shaft 64 of hydraulic motor 66 is controlled by feeding fluid under pressure to the hydraulic motor in a manner that is well-known in the art. The drive disk 36 is provided with a cam 68 mounted on the periphery thereof which is adapted to operate limit switch 70 in a manner to be made clear hereinbelow.

The operation of the clamp mechanism of the present invention is as follows. Fluid motor 66 drives disk 36 thereby causing the linkage system 20 to move movable platen 18 under the action of the fluid link 40. As the disk 36 rotates and platen 18 is moved toward fixed platen 14 the toggle links 22 and 30 begin to stretch out and approach an aligned position. When the links are aligned the platens 14 and 18 are locked together. Just before that position is reached, that is, the links are aligned, the rotation of the drive disk 36 is such that cam 68 trips limit switch 70. The tripping of limit switch 70 by cam 68 results in fluid under pressure from source 58 to be fed via valve 62 and line 56 to chamber 48 for aligning the links 22 and 30 thereby clamping and locking the platens 14 and 18 together. At the same time the limit switch causes the drive disk 36 to be stopped. This may be accomplished in any known manner such as by unclutching the drive disk 36 from motor 66 and applying a brake to the drive disk or, preferably, by interrupting the flow of supply fluid to motor 66. To unlock the linkage system, valves 60 and 62 are moved so as to drain fluid from chamber 48 via line 56 and deliver fluid under pressure to chamber 46 via line 54. The increase in pressure in chamber 46 pushes the links out of alignment. The drive disk 36 is again caused to rotate, as by the fluid motor 66, in the same direction as before continuing the movement of the links 22 and 30 so as to move the platen 18 away from fixed platen 14.

As can be seen from the foregoing description the drive mechanism, that is, the drive disk 36, hydraulic motor 66 and output shaft 64 are not affected by the full thrust force that is necessary to bring the links into alignment for locking and holding the platen 18 in place against fixed platen 14, but only by the force exerted axially by the fluid link 40. Instead, the full thrust force is taken up solely by the link pin 28, the links 22 and 30 and pins 24 and 32, all of which are readily designed to cope with the forces exerted during locking. In order to unlock the clamp mechanism a higher force is usually required than that to bring the clamp mechanism into locking position. For this reason, it is preferable to use the larger surface area of the piston 44 in chamber 46 to unlock the clamp mechanism. However, it should be appreciated, the opposite arrangement as previously discussed is feasible. As noted above, the control of the fluid link is affected by actuation of the hydraulic valves directly by means of cam 68 on drive disk 36 which activates limit switch 70. In addition, as previously noted the fluid motor 66 and output shift 64 may advantageously be connected to drive disk 36 by a clutch in a manner similar to that shown in prior art U.S. Pat. No. 3,117,348 discussed above. In such an arrangement the fluid motor 66 may run uninterrupted and the final stop and start movement of drive disk 36 may be affected by a brake without the need of slowing the motor.

In accordance with a further feature of the present invention, the reciprocating press is provided with a safety feature for detecting an obstruction between the platens 14 and 18 for inactivating the fluid link upon sensing such an obstruction.

A limit switch 72 is provided on the fixed platen 14 and is activated by movable platen 18 when the movable platen 18 is sufficiently close to fixed platen 14 so as to have the platens touch. A pressure transducer 74 is provided for sensing an increase in fluid pressure in chamber 48 for reasons to be expanded on in detail hereinbelow. Alternatively, a conventional linear transducer could be substituted for the pressure transducer 74 for sensing a change in length of the fluid link 40 or movement of the piston 44.

The operation of the safety feature is as follows. Fluid pressure is continuously fed to chamber 48 during the rotation of drive disk 36 so as to maintain piston 44 in a position corresponding to the minimum length of the fluid link. Assuming that an obstructing object is left between fixed platen 14 and platen 18, as the platen 18 moves toward fixed platen 14 the obstruction tends to stop the motion of the platen 18 even though drive disk 36 continues to rotate. The rotation of the drive disk 36 causes the length of the fluid link to increase, that is, the piston 44 to move up in cylinder 42 thereby increasing the pressure in chamber 48. This pressure increase in chamber 48 can be sensed by pressure transducer 74. Alternatively, a conventional linear transducer may be substituted for the pressure transducer 74 for sensing the change in length of the fluid link 40 or the movement of piston 44 in cylinder 42. If the platens close sufficiently to cause the platens to become proximate to each other, limit switch 72 is activated to give a signal. If the first signal, that is the signal generated by the pressure transducer or linear transducer, is detected before the second signal is generated by limit switch 72 caused by the touching of the platens, then an obstruction between the platens is thereby indicated which automatically results in the deactivation of limit switch 70 thereby inactivating the fluid link 40. If no significant time delay occurs between the signals from pressure transducer 74 and the signal from limit switch 72, limit switch 70 is maintained active and upon tripping by cam 68 delivers fluid under pressure to chamber 48 so as to activate the fluid link and clamp the platens in place.

Referring now to FIGS. 3 and 4, a second and third embodiment of the clamp mechanism of the present invention is illustrated. Contrary to the embodiment of FIGS. 1 and 2 where the fluid link 40 for locking the movable platen 18 in place comprises the connection between drive disk 36 and link assembly 20, in the embodiments of FIGS. 3 and 4 the connection between disk 36' and 36", respectively, and linkage assembly 20' comprises a solid connecting rod 80. With reference to FIG. 3 the fluid link 40' for locking the movable platen 18' in place adjusts the position of the drive disk 36' relative to the abutment 12' and platen 14'. The drive disk 36' is rotatably supported on a base or platform 82. The base 82 also carries the fluid motor 66 for driving the drive disk 36'. The base 82 is mounted for vertical movement on support 84 by means of guides 86. The fluid link 40' of the present invention is provided between the base 82 and the support 84 and comprises a cylinder 42' having a piston 44' reciprocally mounted therein for dividing the cylinder into first and second chambers 46' and 48', respectively, in the manner described with regard to the embodiment of FIG. 1. Piston 44' is provided with a piston rod 50' which is connected to the base 82. The cylinder 42' is mounted directly on support 84. Naturally it should be appreciated that an equivalent structure can be obtained by reversing the fluid link, that is, by connecting the cylinder 42' directly to the base 82 and the piston 44 to the support 84 via piston rod 50'.

The operation of the clamp mechanism of the embodiment of FIG. 3 is similar to that described hereinabove with reference to the embodiment of FIG. 1. Fluid motor 66 drives disk 36' thereby causing the linkage system 20' to move movable platen 18' under the action of the fluid link 40'. Just before the links 22' and 30' are aligned, the rotation of drive disk 36' is such that cam 68' trips limit switch 70' thereby delivering fluid under pressure to chamber 48' in the manner described with reference to FIG. 1 for aligning the links 22' and 30' thereby clamping and locking the platens 14' and 18' together. The drive disk 36' is stopped in the same manner as described above with reference to the embodiment of FIG. 1. To unlock the linkage system the fluid is drained from chamber 48' and fluid pressure is delivered to chamber 46' thereby pushing the links out of alignment. The drive disk 36' is again driven by the fluid motor 66 and rotates in the sme direction as before continuing the movement of links 22' and 30' so as to move the platen 18' away from platen 14'. In accordance with a further feature of the present invention, the reciprocating press employing the clamp mechanism of FIG. 3 may be used in combination with the safety feature for detecting an obstruction between the platens 14' and 18' for inactivating the fluid link as was previously described above with reference to the embodiment of FIG. 1.

A further embodiment of the clamp mechanism of the present invention is shown in FIG. 4 wherein the base 82 is pivotably mounted to the support 84. The fluid link 40" of the present invention is mounted between the base 82 and the support 84 in the same manner as described above with regard to FIG. 3. The effect of this arrangement is the same as described above with reference to FIG. 3 except that the force the fluid link has to exert is smaller due to the leverage available through the pivoting mechanism. Thus, the piston and cylinder used in the fluid link 40" of the embodiment illustration in FIG. 4 can be substantially smaller than that used in the embodiment of FIG. 3 and requires less fluid under pressure thereby consuming less energy in operation. The operation of the fluid link 40" for clamping platen 18 in place is the same as discussed above with reference to FIGS. 1 and 3. Again, the embodiment of the clamp mechanism of FIG. 4 may be used in combination with the safety feature for detecting an obstruction between the platens 14 and 18 as previously discussed.

As can be seen from the foregoing, the device of the present invention offers great versatility and efficiency and satisfies the objects set out hereinabove. The clamp mechanism of the present invention assures a high degree of reliability when used with locking forces in excess of 250 tons.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A transmission assembly for moving a first member relative to a second member and selectively locking and unlocking said first member in a first position at a predetermined distance from said second member comprising a linkage system connecting said first member and said second member, drive means for articulating said linkage system for moving said first member relative to said second member, connecting means for transferring motion from said drive means to said linkage system and locking means associated with said linkage system for locking said first member in place relative to said second member at said predetermined distance, said locking means comprising a fluid link.

2. A transmission assembly according to claim 1 wherein said fluid link adjusts the length of said connecting means for locking said first member in place.

3. A transmission assembly according to claim 1 wherein said fluid link adjusts the position of said drive means relative to said first element and said second element for locking said first member in place.

4. A transmission assembly according to claim 2 wherein said fluid link forms said connecting means and comprises a cylinder having a piston reciprocally mounted therein for dividing said cylinder into first and second chambers wherein one of said piston and cylinder is connected to said linkage system and the other of said piston and cylinder is connected to said drive means.

5. A transmission assembly according to claim 4 wherein valve means are provided for selectively feeding fluid under pressure from a source to and from said first and second chambers.

6. A transmission assembly according to claim 5 including means for sensing when said first member is proximate to said first position at a predetermined distance from said second member for controlling the flow of fluid under pressure to said fluid link for locking said first member in place.

7. A transmission assembly according to claim 4 wherein said linkage system comprises a first link having one end rotatably mounted to said first member and its other end rotatably mounted to a link pin and a second link having one end rotatably mounted to said second member and its other end rotatably mounted to said link pin such that said first link and said second link are joined by said link pin.

8. A transmission assembly according to claim 7 wherein said piston is provided with a piston rod rotatably connected to said link pin and said cylinder is rotatably connected to said drive means.

9. A transmission assembly according to claim 8 wherein aid drive means is a rotating disk and said cylinder is eccentrically mounted on said disk.

10. A transmission assembly according to claim 9 wherein a hydraulic motor drives said disk.

11. A transmission assembly according to claim 3 wherein said fluid link comprises a cylinder having a piston reciprocally mounted therein for dividing said cylinder into first and second chambers wherein one of said piston and cylinder is connected to a base on which said drive means is mounted and the other of said piston and cylinder is connected to a support.

12. A transmission assembly according to claim 11 wherein valve means are provided for selectively feeding fluid under pressure from a source to and from said first and second chambers for moving said base relative to said support.

13. A transmission assembly according to claim 12 wherein said base is pivotably mounted.

14. A transmission assembly according to claim 1 including means for sensing when said first member is proximate to said first position at a predetermined distance from said second member for controlling the flow of fluid under pressure to said fluid link for locking said first member in place.

15. A reciprocating press comprising a support, a fixed platen and an abutment, said fixed platen and said abutment being connected on said support such that said fixed platen is spaced from said abutment, a movable platen mounted on said support between said fixed platen and said abutment, said movable platen being movable between a first position wherein said movable platen abuts said fixed platen and a second position wherein said movable platen and fixed platen are apart, a transmission assembly for moving said movable platen between said first position and said second position, said transmission assembly comprising a linkage system connecting said movable platen and said abutment, drive means for articulating said linkage system for moving said movable platen relative to said abutment and said fixed platen, connecting means for transferring motion from said drive means to said linkage system and locking means associated with said linkage system for locking said movable platen in place when said movable platen is in said first position, said locking means comprising a fluid link.

16. A reciprocating press according to claim 15 including means for sensing when said movable platen is proximate to said first position for controlling the flow of fluid under pressure to said fluid link for locking said movable platen in said first position.

17. A reciprocating press according to claim 15 wherein said fluid link adjusts the length of said connecting means for locking said movable platen in said first position.

18. A reciprocating press according to claim 15 wherein said fluid link adjusts the position of said drive means relative to said fixed platen and said abutment for locking said movable platen in said first position.

19. A reciprocating press according to claim 17 wherein said fluid link forms said connecting means and comprises a cylinder having a piston reciprocally mounted therein for dividing said cylinder into first and second chambers wherein one of said piston and cylinder is connected to said linkage system and the other of said piston and cylinder is connected to said drive means.

20. A reciprocating press according to claim 18 wherein said fluid link comprises a cylinder having a piston reciprocally mounted therein for dividing said cylinder into first and second chambers wherein one of said piston and cylinder is connected to a base on which said drive means is mounted and the other of said piston and cylinder is connected to a support.

21. A reciprocating press according to claim 19 wherein valve means are provided for selectively feeding fluid under pressure from a source to and from said first and second chambers.

22. A reciprocating press according to claim 19 wherein said linkage system comprises a first link having one end rotatably mounted to said abutment and its other end mounted to a link pin and a second link having one end rotatably mounted to said movable platen and its other end rotatably mounted to said link pin such that said first link and said second link are joined by said link pin.

23. A reciprocating press according to claim 22 wherein said piston is provided with a piston rod rotatably connected to said link pin and said cylinder is rotatably connected to said drive means.

24. A reciprocating press according to claim 20 wherein said base is pivotably mounted.

25. A reciprocating press according to claim 15 including means for sensing an obstruction between said fixed platen and said movable platen for inactivating said locking means.

26. A reciprocating press according to claim 17 including means for sensing an obstruction between said fixed platen and said movable platen for inactivating said locking means.

27. A reciprocating press according to claim 26 wherein said means for sensing an obstruction comprises a linear transducer which senses the change in length of said connecting means.

28. A reciprocating press according to claim 19 including means for sensing an obstruction between said fixed platen and said movable platen for inactivating said locking means.

29. A reciprocating press according to claim 28 wherein said means for sensing an obstruction comprises a pressure transducer for sensing the change in pressure in one of said first and second chambers.

30. A reciprocating press according to claim 20 including means for sensing an obstruction between said fixed platen and said movable platen for inactivating said locking means.

31. A reciprocating press according to claim 28 wherein said means for sensing an obstruction comprises a pressure transducer for sensing the change in pressure in one of said first and second chambers.

32. A reciprocating press according to claim 16 further including means for sensing an obstruction between said fixed platen and said movable platen for inactivating said locking means.

* * * * *